(No Model.)

LA MARCUS A. THOMPSON.
CAR WHEEL.

No. 379,254. Patented Mar. 13, 1888.

WITNESSES:
Hermann Bormann
Thomas M. Smith

INVENTOR:
La Marcus A. Thompson
By J. Walter Douglass
Atty.

United States Patent Office.

LA MARCUS A. THOMPSON, OF PHILADELPHIA, PENNSYLVANIA.

CAR-WHEEL.

SPECIFICATION forming part of Letters Patent No. 379,254, dated March 13, 1888.

Application filed November 7, 1887. Serial No. 254,476. (No model.)

*To all whom it may concern:*

Be it known that I, LA MARCUS A. THOMPSON, of the city and county of Philadelphia, in the State of Pennsylvania, have invented certain new and useful Improvements in Car-Wheels, of which improvements the following is a specification.

My invention relates to certain novel features of improvement in wheels for cars running upon metal or other rails; and the principal object thereof is to provide a wheel of light and simple construction that will be practically noiseless in operation.

My invention consists in providing a car-wheel having a yielding substance interposed between the rail and the metallic or other portion or hub of the wheel which sustains the weight of the car, and which yielding substance serves as a cushion or spring to neutralize inequalities of the rail and absorb vibration, thereby rendering such a wheel while in action practically noiseless, and especially well adapted for use in connection with cars on overhead or elevated railways.

The nature of the invention will be more fully understood taken in connection with the accompanying drawings, wherein such a form of car-wheel is clearly illustrated, and in which—

Figure 1:
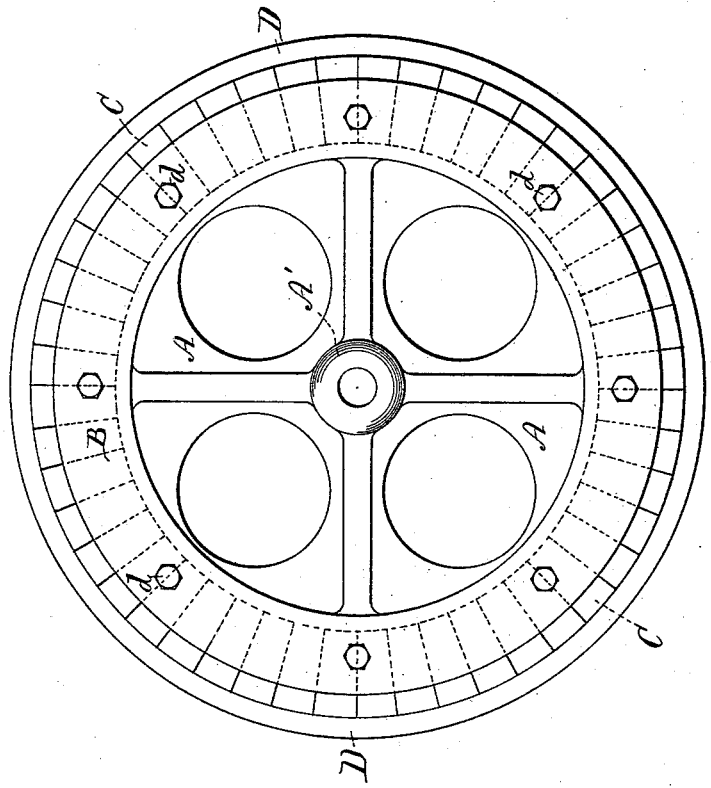
Figure 2:
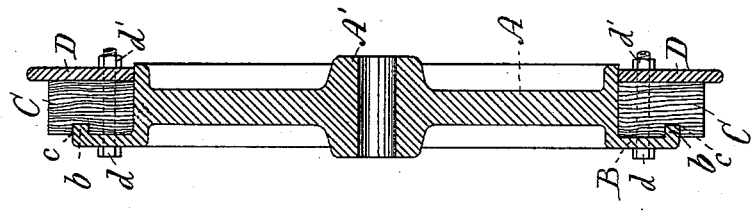
Figure 3:
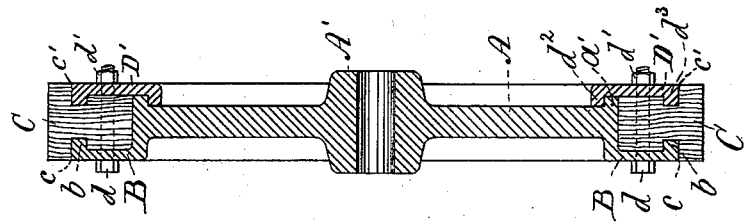

Figure 1 is a front elevation of my improved car-wheel. Fig. 2 is a central section thereof, and Fig. 3 is a similar view of a modified form of the car-wheel.

Referring to the drawings for a further description of the invention, A represents a metal wheel or wheel-frame similar in construction to that of an ordinary car-wheel, but having a deeper flange, B, and with its edge *b* turned slightly over and inward toward the periphery of the wheel. A' is the hub formed integral therewith.

Around the circumference of the wheel-frame A is placed a ring of stout or hard wood, C, and this ring is preferably formed in segmental sections, so that the grain of the wood will be in the direction of the radius of the wheel, thereby throwing the tread of the wheel on the end of the grain. The turned-over rim *b* of the flange B enters a groove, *c*, formed in the wooden wearing-ring C, thereby preventing the same from parting, or if the ring is built up in sections they are securely bound together thereby. This ring C is kept in position laterally by a flange or ring, D, of suitable metallic material, but of greater diameter than the wearing-ring C, which is fastened by bolts *d*, passing through the ring of wood and through the opposite flange B, and held to place by nuts *d'*. The projecting edge of the binding-ring D forms the guiding-flange of the wheel when placed upon the rail, as clearly shown in Figs. 1 and 2.

The rolling contact-surface of a wheel constructed as above described will be compressible to a certain extent, and will therefore not be so sensitive to inequalities in the material of the rails as a metal-surfaced wheel would, and thus in a less degree is such wheel susceptible of transmitting vibrations, and hence sound as a consequence is very appreciably deadened. It is obvious, however, that other substances possessing similar sound deadening qualities might be advantageously used, instead of wood, for the purpose, and, moreover, that the manner of combining the parts together might be varied without departing from the real spirit of my invention hereinbefore described, and therefore I crave the right to modify the same in such manner as will give better results in the more extended practice of the invention.

The flange or ring D of each wheel, composed preferably of metallic substance, will be apt in operation to come occasionally in contact with the outer edges of the rails, and hence seemingly tend to produce noise; but the noise resulting therefrom will be so slight that it may be entirely dismissed from consideration and the wheel hereinbefore described in action termed a practically "noiseless" one in the highest sense or degree.

In Fig. 3 is shown a modified form of my improved car-wheel, which consists of a metallic wheel or wheel-frame, A, and a hub, A', formed integral therewith, both of which are similar in construction to the wheel hereinbefore described, with an angular flange, B, having its edge *b* bent inward in the direction of the periphery of the wheel. Around the circumference of this wheel-frame A is inserted a ring of wood or other suitable yielding material, and this ring is preferably built up in sections, so that the grain of the wood will be in the dirction of the radius of the wheel, thus throwing the entire tread of the wheel on the ends of the grain of the wood. The rim $b$ of the flange B enters a groove, $c$, formed in the ring C, of wood or other suitable material, thereby preventing the same from parting; or if this ring is built up in sections—a form preferred—they will be securely bound together by this flange B. The ring C, in sections, is kept in position laterally by a double flange-ring, D', the inner flange, $d^2$, of which rests snugly onto the flange $a'$ of the frame A, and the outer flange, $d^3$, of the ring D' is fitted into a groove, $c'$, provided in the ring-sections C, as shown in Fig. 3, and this ring D' held solidly up against the wheel-frame A and the ring C by means of bolts and nuts $d$ and $d'$, and the wearing-ring C held solidly in position and taking up the entire width or rolling contact-surface of the wheel.

This type of noiseless wheel is more especially designed for use on an ordinary well-known construction of metal rail used on surface railways; but obviously this form of wheel is susceptible of other uses.

Having thus described the nature and objects of my invention, what I claim as new, and desire to secure by Letters Patent, is—

1. The combination, in a noiseless car-wheel, with a metallic frame having a series of openings in the surface thereof, a hub formed integral therewith and projecting laterally from the sides of said frame, and a flange with a turned-in rim formed integral with said metallic frame, of a wearing ring composed of a series of segmental sections of wood having recesses in one of the sides thereof for engaging with the turned-in rim of said flange, and a detachable ring or tire, D, and bolts $d$ and nuts $d'$, all arranged as shown and described, whereby said wearing-ring and said tire may be held solidly together against said flange and metallic frame, as and for the purposes specified.

2. The combination, with the frame A, with its flange B and rim $b$, of the wearing-rim C, composed of a series of sections of wood, the flange D, with its inner upper and lower rims, $d^2$ and $d^3$, and the bolts and nuts $d$ and $d'$, all arranged as shown and described, and for the purposes set forth.

In witness whereof I have hereunto set my signature in the presence of two subscribing witnesses.

LA MARCUS A. THOMPSON.

Witnesses:
NATHANIEL M. JONES,
M. T. HALPHIDE.